(12) United States Patent
de Souza

(10) Patent No.: US 7,818,671 B2
(45) Date of Patent: Oct. 19, 2010

(54) VIRTUAL NAVIGATION OF MENUS

(75) Inventor: Jeremy de Souza, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 555 days.

(21) Appl. No.: 11/215,686

(22) Filed: Aug. 29, 2005

(65) Prior Publication Data

US 2007/0050721 A1    Mar. 1, 2007

(51) Int. Cl.
    *G06F 3/00* (2006.01)
(52) U.S. Cl. .................... 715/709; 715/727
(58) Field of Classification Search .............. 715/709, 715/727, 705
    See application file for complete search history.

(56) References Cited

U.S. PATENT DOCUMENTS

| | | | | |
|---|---|---|---|---|
| 5,175,812 A | * | 12/1992 | Krieger | 715/708 |
| 5,317,688 A | * | 5/1994 | Watson et al. | 715/707 |
| 7,000,187 B2 | * | 2/2006 | Messinger et al. | 715/705 |
| 2003/0058266 A1 | * | 3/2003 | Dunlap et al. | 345/705 |
| 2005/0086610 A1 | * | 4/2005 | Mackinlay et al. | 715/817 |

OTHER PUBLICATIONS

Microsoft® Notepad, Version 5.1, Copyright (c) 1981-2001 Microsoft Corporation, pp. 1-4.*

* cited by examiner

*Primary Examiner*—Steven P Sax
*Assistant Examiner*—Andrey Belousov
(74) *Attorney, Agent, or Firm*—Merchant & Gould

(57) ABSTRACT

Menus within an application may be virtually navigated. While a user is virtually navigating the menus and exploring the user interface (UI) elements using the virtual menus, the system's current focus is maintained. Virtual navigating menus assist a user in learning the commands that are associated with an application. Instead of having to physically navigate to the menus that change the system focus, a user may virtually navigate to a menu to learn what commands or features an application supports. The virtual menus behave just as the regular menu items behave within the application without the state of the application changing.

20 Claims, 4 Drawing Sheets

VIRTUAL NAVIGATION OF MENUS

BACKGROUND

Reading a computer screen can be difficult for many visually impaired users. In order to assist these users in navigating computer screens, many different applications and devices have been developed. Two applications that are commonly utilized by the visually impaired to navigate a computer screen are screen readers and screen magnifiers. Generally, a screen reader determines what is on the screen and communicates this information to the user through a speech synthesizer or a Braille display. A screen magnifier magnifies a portion of the screen such that the user can more easily read the magnified portion of the screen.

When a screen reader is running, a synthesized voice may describe menu items, keyboard entries, graphics and text for other applications. For example, when a user presses the space bar, the screen reader may say "space." Similarly, when the cursor is over a menu item of another application, the screen reader may say the command name. Users typically navigate the computer screen using keyboard shortcuts while listening to the audio generated by the screen reader. When exploring the screen to determine its content, a user may lose track of their position on the screen or may accidentally change the state of a control on the screen.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Menus within an application may be virtually navigated. While a user is virtually navigating the menus and exploring the user interface (UI) elements the system's current focus is maintained. Virtual navigating menus assist a user in learning the commands that are associated with an application. Instead of having to physically navigate to the menus that result in a change to the system focus, a user may virtually navigate to a menu to learn what commands or features an application supports. The virtual menus behave just as the regular menu items behave within the application without the state of the application changing. The virtual menus may be used as a help tool to help provide information to a user without the fear of changing the state of the application as a result of invoking a menu item. The virtual menus help a new user in navigating an application's menus without needing to remember hard-to-remember key bindings.

DETAILED DESCRIPTION

Figure 1:
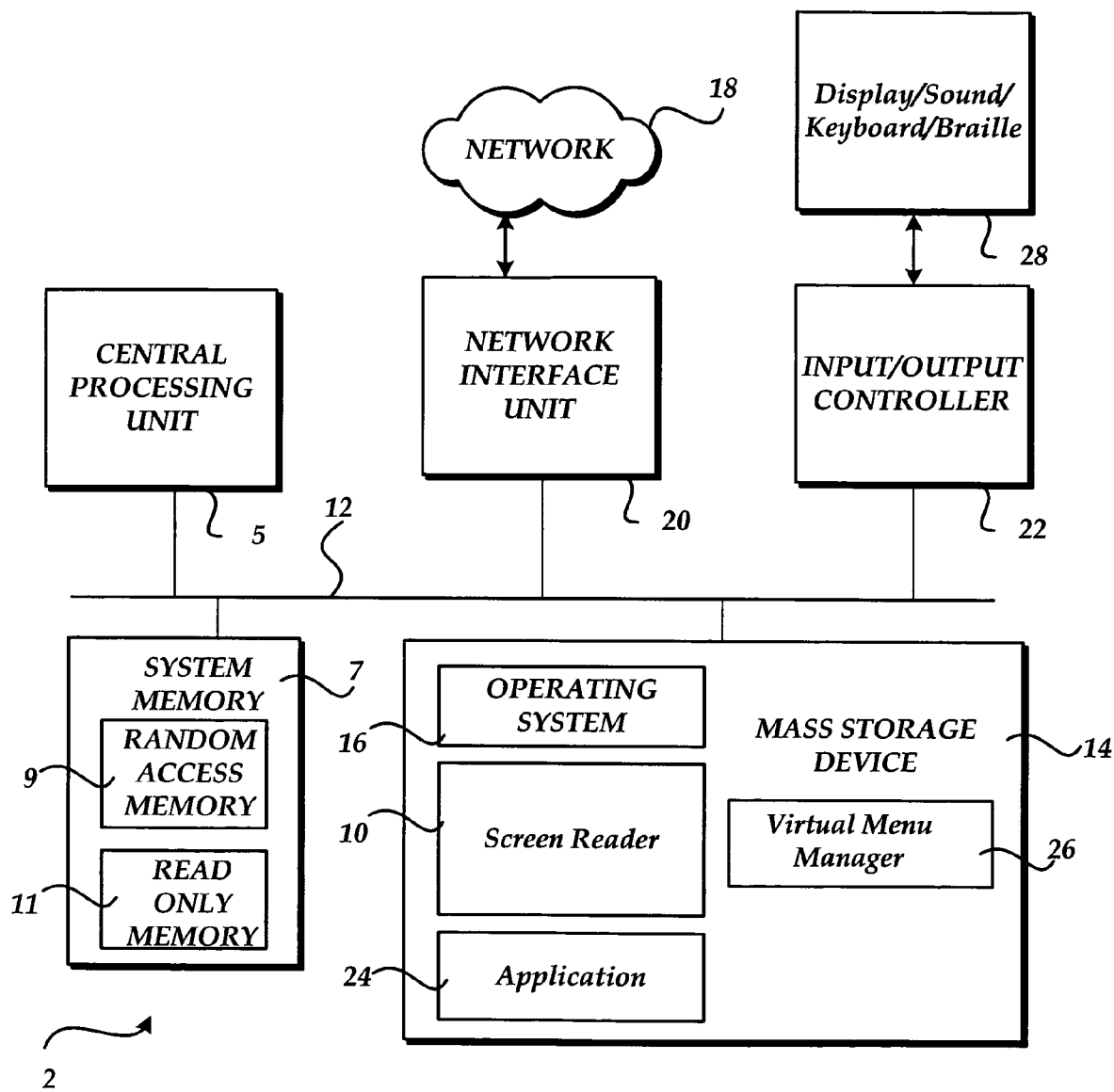
FIG. 1 illustrates an exemplary computing architecture for a computer.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, the computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments, the computer 2 may operate in a networked environment using logical connections to remote computers through a network 18, such as the Internet. The computer 2 may connect to the network 18 through a network interface unit 20 connected to the bus 12. The network interface unit 20 may also be utilized to connect to other types of networks and remote computer systems. The computer 2 also includes an input/output controller 22 for receiving and processing input from a number of devices, such as: a keyboard, mouse, Braille display, speech recognizer, electronic stylus and the like (28). Similarly, the input/output controller 22 may provide output to a display screen, a Braille display, a speech synthesizer, a printer, or some other type of device (28).

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a screen reader application program 10. The screen reader application program 10 is operative to provide functionality for reading elements on a screen, such as reading elements associated with application 24. According to one embodiment of the invention, the screen reader application program 10 comprises the Navigator® screen reader application program from MICROSOFT CORPORATION. Other screen reader applications, screen magnification programs, and other programs to assist disabled users from other manufacturers may also be utilized.

The screen reader application program 10 utilizes a virtual menu manager 26 to assist in virtually navigating the menus that are associated with screen reader 10. As will be described in greater detail below, the virtual menu manager 26 performs an algorithm to virtually navigate the menus associated with screen reader 10 by adjusting a virtual focus to move within the menus instead of altering the current system focus. Additional details regarding the operation of the virtual menu manager 26 will be provided below.

Figure 2:
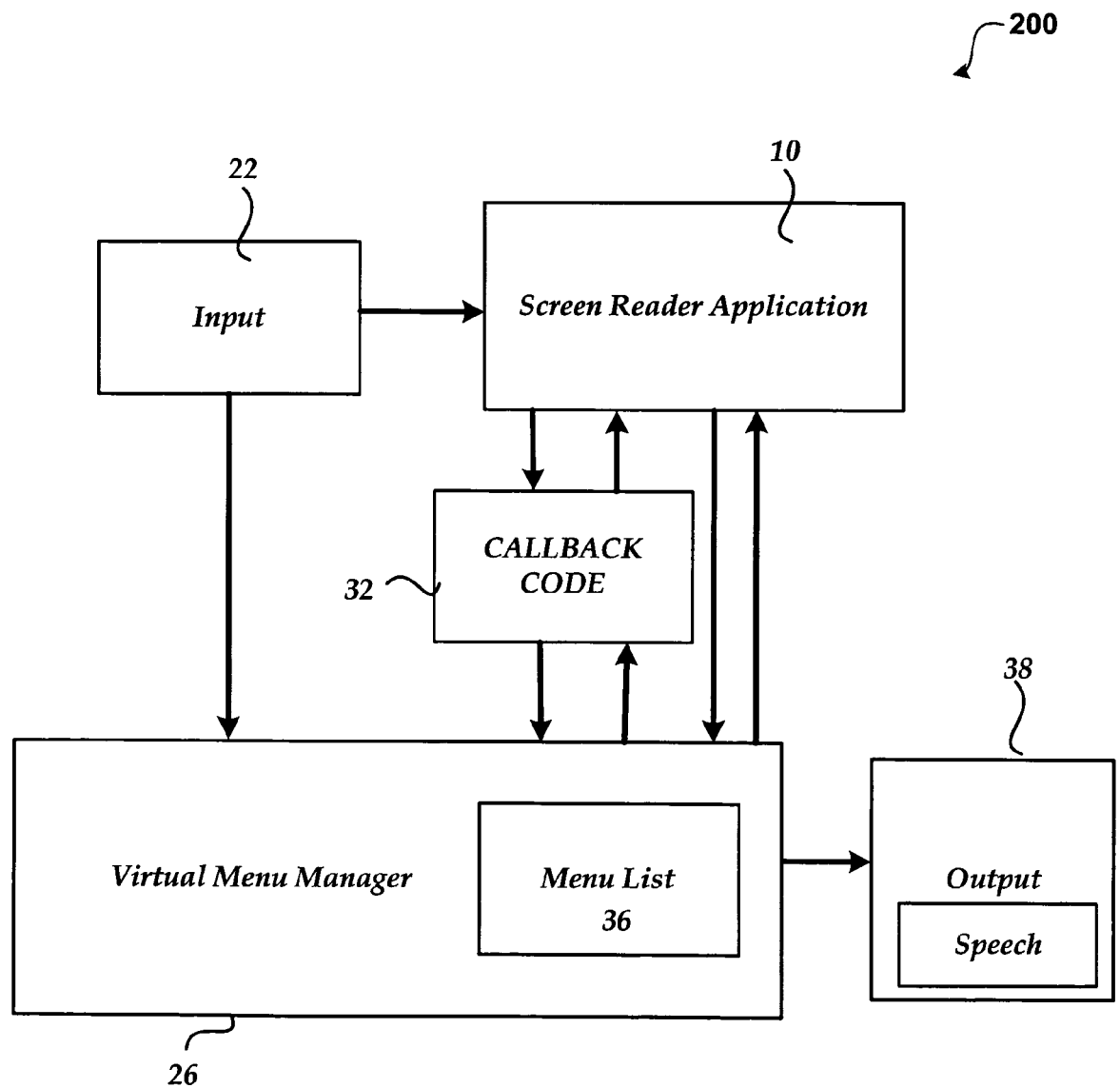
FIG. 2 illustrates a virtual menu navigation system.

FIG. 2 illustrates a virtual menu navigation system 200, in accordance with aspects of the invention. As described briefly above, the virtual menu manager 26 provides a virtual menu navigation mode for navigating menus associated with an application.

Virtual menu navigation is directed toward improving the discoverability of application commands and to reduce the need for hard-to-remember key bindings. Instead of having to physically navigate to the menus of application 10, a user may virtually navigate to a menu to learn the features of an application. The application's commands are also accessible via virtual menu mode navigation. According to one embodiment, while virtually navigating the menus within the application, virtual menu manager 26 provides access to the menus of screen reader application 10 without actually displaying the menus to the user. Instead of displaying the menus, the text that is associated with the menus is spoken through a speech output (38) as if the menus were being activated even though the system focus remains constant. A description of the menu item may also be provided.

During the time the user is navigating in virtual menu navigation mode the virtual menus behave just as the regular menu items behave within screen reader application 10 without the state of the application changing. The virtual menu mode has been found to be especially helpful for new users when they are learning the features of a new application.

Virtual menu manager 26 may be implemented within screen reader application 10 or may be implemented externally from screen reader application 10. In order to facilitate communication with the virtual menu manager 26, one or more callback routines, illustrated in FIG. 2 as callback code 32 may be implemented. Through the use of the callback code 32, the virtual menu manager 26 may query for additional information necessary to determine the menu items associated with the application 10.

Virtual menu manager 26 provides the information about the menus of application 10 that is output through output 38. Virtual menu manager 26 keeps tracks of the current virtual focus position within the menus and announces changes as the user navigates virtually from menu item to menu item.

According to one embodiment, the announcement includes the name of the menu item and a brief description. The announcements may be made through output 38 using a speech synthesizer or some other device.

Virtual menu manager 26 may store a list, such as menu list 36 that contains the menu items and their descriptions for application 10. For example, the menu list 36 may be a hierarchical representation of the menu items for the application. Any representation of the menu items, however, may be used. For example, all of the menu items may be contained within a flat list. Commands may also be used to navigate within the element list, i.e. next menu item, previous menu item, and the like.

Any, or all, of the applications utilized within system 200 may be speech enabled. Speech-enabled applications are a particular benefit to users with disabilities, particularly those who cannot easily read a display screen. According to one embodiment, screen reader 10 is a speech-enabled application that may receive commands by voice input. In this embodiment, a user may change the virtual menu item by using a voice command.

While navigating in the virtual menu mode, the user may invoke a command on the menu item to determine the effect of invoking the command. When virtually navigating a menu item, the actual state of the menu item of application does not change when the command is invoked. When a menu item is invoked, virtual menu manager 26 provides a description of the result of virtually invoking the menu item to output 38.

Virtual menu manager 26 registers to receive input from input component 22. These input requests 22 may be from many different sources, including a keyboard, a mouse, a speech recognizer, and the like. According to one embodiment, the user selects a predetermined keyboard sequence to enter and exit the virtual menu navigation mode. When in virtual menu mode keystrokes not related to virtually navigating the menu are consumed. According to one embodiment, the keystrokes for virtually navigating the menu are the same as the keystrokes that are used to navigate the actual menu item for the application. For example, when operating on a UNIX platform, standard keystrokes to navigate UNIX applications may be used. Similarly, when operating on a Microsoft Windows® platform, standard keystrokes to navigate these menus may be used.

According to one embodiment, the following commands are utilized:

| | | |
|---|---|---|
| Virtual Menu Navigation Mode | Insert, Ctrl + Home | Enter Virtual Menu mode |
| Tab Forward | Tab | Move forwards in tab order |
| Tab backwards | Shift + Tab | Move backwards in tab order |
| Move Right | Right Arrow | Move right in virtual menu |
| Move Left | Left Arrow | Move left in virtual menu |
| Move Down | Down Arrow | Move down in virtual menu |
| Move Up | Up Arrow | Move up in virtual menu |

Once the user has navigated to a command they can execute the command by selecting the enter key. According to one embodiment, the virtual menu navigation mode is exited when the system focus changes.

Figure 3:
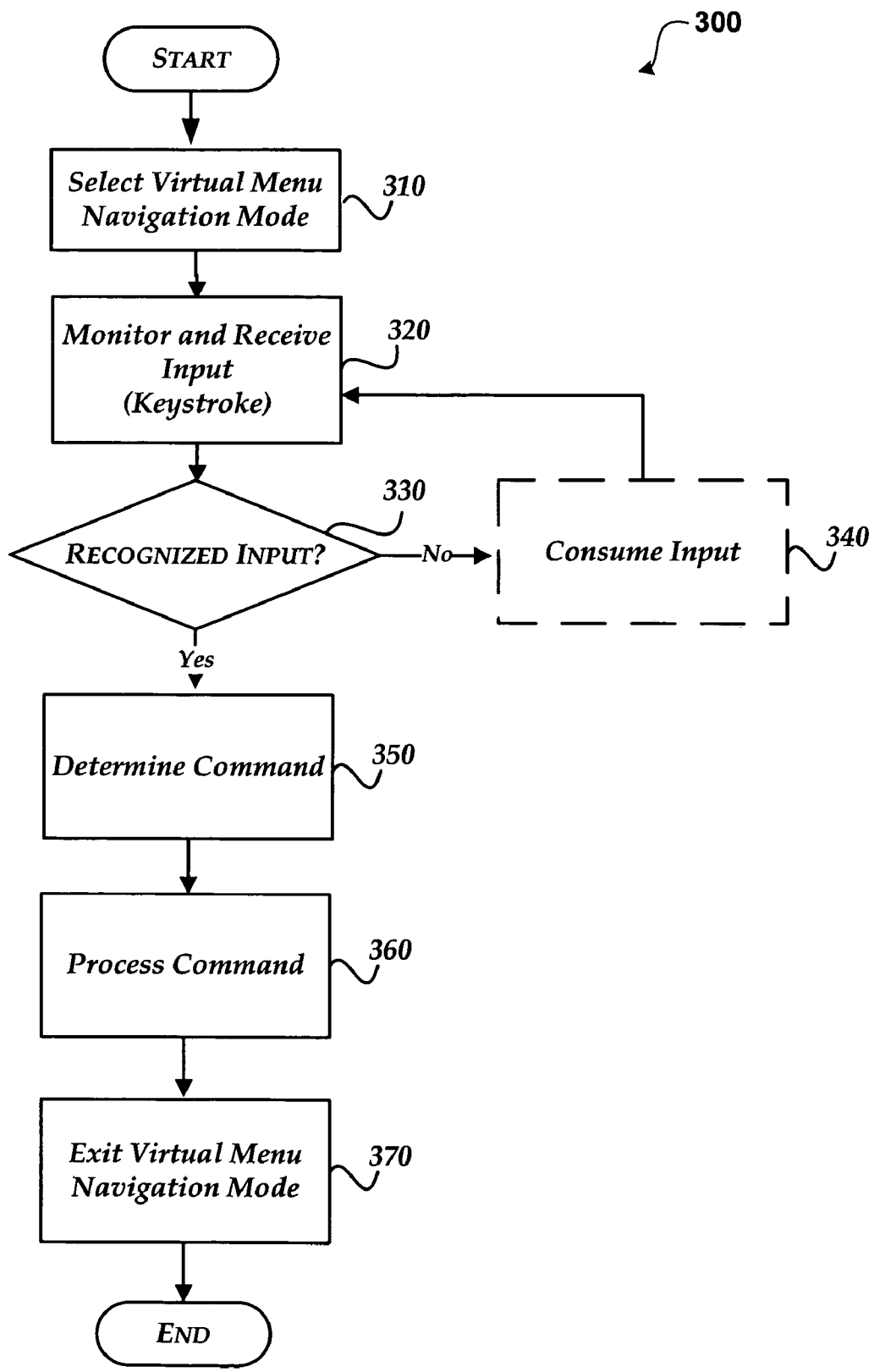
FIG. 3 shows a process for virtually navigating a menu.
Figure 4:
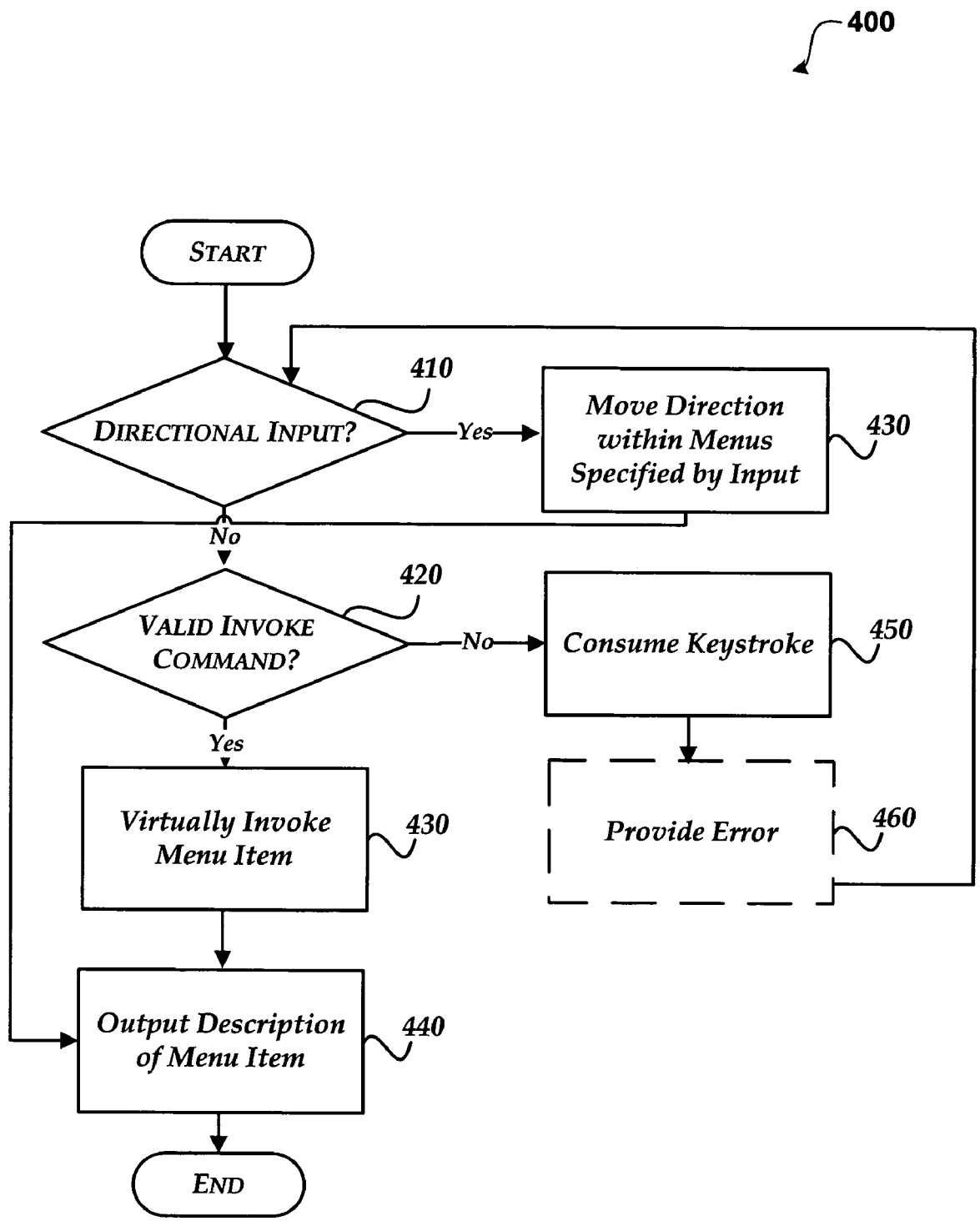
FIG. 4 illustrates virtually determining and processing an input while virtually navigating a menu, in accordance with aspects of the present invention.

Referring now to FIGS. 3 and 4, an illustrative process for virtually navigating menus that are associated with an application will be described. Although the embodiments described herein are presented in the context of a virtual menu manager 26 and a screen reader application program 10, other types of application programs may be utilized in association with virtual menu manager 26. For instance, the embodiments described herein may be utilized within a screen magnifier application program, an application program that provides output to a Braille device, and the like.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments of the described herein are referred to variously as operations, structural devices, acts or modules. These operations, structural devices, acts and modules may be implemented in software, in firmware, in special purpose digital logic, and any combination thereof.

FIG. 3 shows a process for virtually navigating a menu. After a start operation, the process moves to operation 310, where the virtual menu navigation mode is selected. According to one embodiment, the virtual menu navigation mode is selected by entering a predefined keyboard sequence. For instance, pressing the Insert key followed by the Ctrl key in combination with the home key. Other methods, however, may be used to enter virtual menu navigation mode. For example, a speech command, a mouse selection, or some other input method may be used to select the virtual menu navigation mode. Alternatively, the first time an application is run the application may start in the virtual menu mode.

Moving to operation 320, input is monitored and received. According to one embodiment, the process monitors for any keystrokes. Other input may also be monitored. For example, mouse input, speech input, and the like may be monitored. The received input may be discarded or acted upon depending on the keystroke.

Flowing to decision operation 330, a determination is made as to whether the input is recognized. Generally, input is recognized when the input is used to specify a direction to navigate within a menu and/or input that is used to invoke a menu item. According to one embodiment, a predefined set of keys on a keypad are used to virtually navigate the menus and execute the menu item. For example, pressing the 2 key on the keypad could move the position downward, while pressing the 8 key could move the position within the menu upward. Any method of receiving a movement indication may be used.

When the input is not recognized the process moves to optional operation 340 where the input is consumed. In other words, any input that is not related to virtual menu mode navigation is ignored. The process then returns to operation 320.

When the input is recognized, the process flows to operation 350 where the command relating to the input is determined. Generally, the input is determined to be one of a directional command that is used to move within a menu and an invoke command that is used to provide information about what occurs when the menu item is selected (See FIG. 4 and related discussion).

Flowing to operation 360, the command is processed based upon the input received. Generally, when the input is a directional command, the virtual focus moves as directed within the virtual menu as specified by the input and when the input is an invoke command the menu item is virtually invoked (See FIG. 4 and related discussion).

Moving to operation 370, the virtual menu navigation mode is exited. According to one embodiment, the virtual menu mode is exited when the system focus changes. For example, a user could select another window to change the focus. According to another embodiment, the virtual menu mode is exited upon receiving a predetermined command.

The process then moves to an end operation and returns to processing other actions.

FIG. 4 illustrates virtually determining and processing an input while virtually navigating a menu, in accordance with aspects of the invention.

Flowing to decision operation 410, a determination is made as to whether the input is a directional command. According to one embodiment, the input may be determined to be a directional command that is used to move up, down, left, and right within a menu and an invoke command that is used to provide information about what occurs when the menu item is selected.

When the command is a directional command, the process moves to operation 430 where the virtual focus is positioned within the menus based on the direction specified by the input.

When the input is not a directional command, the process moves to decision operation 420, where a determination is made as to whether the input is a valid invoke command. According to one embodiment, a valid invoke command is pressing the "enter" key while the virtual focus is over the menu item. Any keystroke or keystrokes, however, may be defined to be a valid invoke command. For example, a function key, a ctrl key plus some other key, and the like could be used to invoke a command.

When the input is a valid invoke command the process moves to operation 430 where the menu item is virtually invoked. While in virtual menu navigation mode, invoking a menu item does not change the state of the application even though the user is provided with the result of invoking the menu item. This allows a user to experiment with menu items without having to worry about the effects of invoking an unknown command.

When the input is not an invoke command the process flows to operation 450 where the keystroke is consumed (ignored). The process then moves to optional operation 460 where an error is provided to the user. For example, an error sound may be generated and provided to the user. The process then returns to decision operation 410.

When the input is a directional input or a valid invoke command, the process moves to operation 440 the description of the menu item or the description of the result of virtually invoking the menu item is provided to the user. The information relating to the input may be provided in many different ways. For example, the description may be spoken to the user, provided on a Braille display, and the like.

The process then moves to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for navigating a menu of an application, comprising:

entering a virtual menu navigation mode; wherein the virtual menu navigation mode allows a user to navigate the menu of the application without adjusting a location of a current system focus and without displaying on a user interface of the application the menu being virtually navigated; wherein navigation of the menu in the virtual menu navigation mode includes adjusting a location of a virtual focus while maintaining and not changing the location of the current system focus; wherein the virtual focus is a locus of focus that is independent of the current system focus and wherein the virtual focus moves independently from the current system focus; wherein the location of the current system focus and the location of the virtual focus is a same location when the virtual menu navigation mode is entered;

receiving an input;

determining when the input is a directional input;

in response to determining the input is a valid directional input for a menu:

updating the location of the virtual focus within the menu in response to the input while maintaining the location of the current system focus;

determining a menu item within the application that currently has the virtual focus;

providing audio information about the menu item that currently has the virtual focus without graphically displaying the menu item; wherein the audio information comprises a name of the menu item and a description of the menu item; and in response to determining the input is not a valid directional input for the menu:

determine whether the input is a valid invoke command for the menu item;

in response to determining the input is a valid invoke command for the menu item:

providing audio information about an effect of invoking the menu item, wherein the information provided comprises a description of a result caused by invoking the menu item; the menu item that currently has the virtual focus without displaying the menu item;

in response to determining the input is not a valid invoke command:

consuming the input;

providing an error; and exiting the virtual menu navigation mode when the current system focus changes; wherein the location of the current system focus changes when the menu is navigated outside of the virtual menu navigation mode.

2. The method of claim 1, further comprising storing a list of menu items that comprises each menu item of the item and a description of each menu item, wherein the list of menu items is accessed while virtually navigating the application.

3. The method of claim 1, wherein providing the information about the menu item further comprises providing the information relating to the result of invoking the menu item without changing a state of the application.

4. The method of claim 1, wherein receiving the input comprises receiving a voice input navigational command.

5. The method of claim 1, wherein the directional input is received through the use of at least one of: a keypad; a keyboard; and a voice input and specifies a left, a right, an up, and a down direction.

6. The method of claim 2, further comprising navigating the menu using arrow keys.

7. The method of claim 2, wherein providing the audio information includes providing information using a Braille display.

8. A computer-readable medium having computer-executable instructions for navigating menu items of an application using a virtual focus, comprising:

entering a virtual menu navigation mode; wherein the virtual menu navigation mode allows a user to navigate the menu of the application without adjusting a location of a current system focus and without displaying on a user interface of the application the menu being virtually navigated; wherein navigation of the menu in the virtual menu navigation mode includes adjusting a location of a virtual focus while maintaining and not changing the location of the current system focus; wherein the virtual focus is a locus of focus that is independent of the current system focus and wherein the virtual focus moves independently from the current system focus; wherein the location of the current system focus and the location of the virtual focus is a same location when the virtual menu navigation mode is entered;

receiving an input;

determining when the input is a directional input;

in response to determining the input is a valid directional input for a menu:

updating the location of the virtual focus within the menu in response to the input while maintaining the location of the current system focus;

determining a menu item within the application that currently has the virtual focus;

providing audio information about the menu item that currently has the virtual focus without graphically displaying the menu item; wherein the audio information comprises a name of the menu item and a description of the menu item; and in response to determining the input is not a valid directional input for the menu:

determine whether the input is a valid invoke command for the menu item;

in response to determining the input is a valid invoke command for the menu item:

providing audio information about an effect of invoking the menu item, wherein the information provided comprises a description of a result caused by invoking the menu item; the menu item that currently has the virtual focus without displaying the menu item;

in response to determining the input is not a valid invoke command:

consuming the input;

providing an error; and exiting the virtual menu navigation mode when the current system focus changes; wherein the location of the current system focus changes when the menu is navigated outside of the virtual menu navigation mode.

9. The computer-readable medium of claim 8, further comprising storing a list of menu items that comprises each menu item of the item and a description of each menu item, wherein the list of menu items is accessed while virtually navigating the application.

10. The computer-readable medium of claim 9, wherein the directional input is received through the use of at least one of: a keypad; a keyboard; and a voice input and specifies a left, a right, an up, and a down direction.

11. The computer-readable medium of claim 9, wherein invoking the menu item further comprises providing information relating to a result of invoking the menu item without changing a state of the application.

12. The computer-readable medium of claim 9, further comprising determining when a system focus changes as a result of a selection of a different window outside of the application that is displayed and exiting the virtual menu navigation mode.

13. The computer-readable medium of claim 9, further comprising consuming keystrokes unrelated to the virtual navigation.

14. The computer-readable medium of claim 9, wherein the directional input indicates moving the virtual focus from one menu item to another menu item.

15. A system for navigating menus within an application using a virtual menu navigation mode, comprising:
    an application having menu items;
    an input component configured to receive input;
    an output component configured to provide information relating to a menu item;
    a virtual menu manager that is coupled to the application and the input component and that is configured to:
    entering a virtual menu navigation mode; wherein the virtual menu navigation mode allows a user to navigate the menu of the application without adjusting a location of a current system focus and without displaying on a user interface of the application the menu being virtually navigated; wherein navigation of the menu in the virtual menu navigation mode includes adjusting a location of a virtual focus while maintaining and not changing the location of the current system focus; wherein the virtual focus is a locus of focus that is independent of the current system focus and wherein the virtual focus moves independently from the current system focus; wherein the location of the current system focus and the location of the virtual focus is a same location when the virtual menu navigation mode is entered;
    receiving an input;
    determining when the input is a directional input;
    in response to determining the input is a valid directional input for a menu:
        updating the location of the virtual focus within the menu in response to the input while maintaining the location of the current system focus;
        determining a menu item within the application that currently has the virtual focus;
        providing audio information about the menu item that currently has the virtual focus without graphically displaying the menu item; wherein the audio information comprises a name of the menu item and a description of the menu item; and
    in response to determining the input is not a valid directional input for the menu:
        determine whether the input is a valid invoke command for the menu item;
    in response to determining the input is a valid invoke command for the menu item:
        providing audio information about an effect of invoking the menu item, wherein the information provided comprises a description of a result caused by invoking the menu item; the menu item that currently has the virtual focus without displaying the menu item;
    in response to determining the input is not a valid invoke command:
        consuming the input;
        providing an error; and
    exiting the virtual menu navigation mode when the current system focus changes; wherein the location of the current system focus changes when the menu is navigated outside of the virtual menu navigation mode.

16. The system of claim 15, further comprising storing a list of menu items that comprises each menu item of the item and a description of each menu item, wherein the list of menu items is accessed while virtually navigating the application.

17. The system of claim 15, wherein providing the information about the menu item further comprises determining when the menu item is invoked and providing information relating to a result of invoking the menu without changing a state of the application.

18. The system of claim 15, wherein the directional input is received through the use of at least one of: a keypad; a keyboard; and a voice input and specifies a left, a right, an up, and a down direction.

19. The system of claim 16, further comprising exiting the virtual menu navigation mode when a system focus changes as a result of a selection outside of the application.

20. The system of claim 16, further comprising consuming input that is unrelated to the virtual menu mode navigation.

* * * * *